United States Patent [19]

Hurst et al.

[11] Patent Number: 4,600,958
[45] Date of Patent: Jul. 15, 1986

[54] THIN-FILM MULTITRACK MAGNETIC HEAD OF HIGH TRACK DENSITY

[75] Inventors: Kurt Hurst; Kurt Neuffer; Karl-Franz Reinhart, all of Stuttgart, Fed. Rep. of Germany

[73] Assignee: Robert Bosch GmbH, Stuttgart, Fed. Rep. of Germany

[21] Appl. No.: 458,643

[22] Filed: Jan. 17, 1983

[30] Foreign Application Priority Data

Feb. 6, 1982 [DE] Fed. Rep. of Germany ....... 3204184

[51] Int. Cl.⁴ .................. G11B 5/17; G11B 5/147; G11B 5/29
[52] U.S. Cl. .................. 360/123; 360/126; 360/121
[58] Field of Search .............. 360/113, 119, 121, 122, 360/123, 126

[56] References Cited

U.S. PATENT DOCUMENTS

| 3,611,417 | 10/1971 | Sauter et al. | 346/74 M |
|---|---|---|---|
| 3,685,144 | 8/1972 | Trimble | 29/603 |
| 3,805,291 | 4/1974 | Sakurai | 360/120 |
| 3,889,295 | 6/1975 | Billawala | 360/123 |
| 3,987,488 | 10/1976 | Kanai et al. | 360/123 |
| 4,001,890 | 1/1977 | Kayser | 360/121 |
| 4,044,394 | 8/1977 | Hanazono et al. | 360/123 |
| 4,092,688 | 5/1978 | Nomura et al. | 360/121 |
| 4,151,574 | 4/1979 | Gerkema et al. | 360/113 |
| 4,165,525 | 8/1979 | Koel et al. | 360/125 |
| 4,219,855 | 8/1980 | Jones | 360/125 |
| 4,295,173 | 10/1981 | Romankiw et al. | 360/125 |
| 4,320,428 | 3/1982 | Somers | 360/123 |

FOREIGN PATENT DOCUMENTS 5275421 6/1977 Japan ........................... 360/124

OTHER PUBLICATIONS

Kehr et al., "High—Density Head," IBM Technical Disclosure Bulletin, vol. 18, No. 1, Jun. 1975.
Romankiw et al., "Batch Fabrication of Thin Film Magnetic Recording Heads," IEEE Transactions on Magnetics, vol. Mag.—11, No. 1, Jan. 1975.

Primary Examiner—A. J. Heinz
Assistant Examiner—Benjamin Urcai
Attorney, Agent, or Firm—Frishauf, Holtz, Goodman & Woodward

[57] ABSTRACT

For saving lateral space in a multitrack magnetic head, the connection lead paths (11, 12) run separately side by side along the outside surface of one magnetic layer (13) of the yoke and connect with the conducting strip that runs between the magnetic layers at the open end of the yoke by straps (18, 19) running around the side edges of the upper magnetic layer. Outside the region of the yoke these conductor straps are wider and are superposed one on the other, with an insulating layer between them, for lower resistance loss (see lower part of figure).

11 Claims, 5 Drawing Figures

THIN-FILM MULTITRACK MAGNETIC HEAD OF HIGH TRACK DENSITY

This invention concerns a thin-film multitrack magnetic head capable of recording digital signals representing sounds, video information or data generally, utilizing first and second magnet layers, each of which can be a double or a single layer and which together form a magnetic yoke between the arms of which a conductor or conducting path is provided connected at it ends to connecting leads likewise in the form of conducting strip paths. Such a yoke and associated conductor (or conductors, if a two-turn winding is involved) is provided for each track served by the multitrack head.

A magnetic head of the kind just described is known, for example, from German published patent application (OS) No. 30 07 046, describing a magnetic transducer head for producing a recording on a magnetic recording medium which is moved past the head. The head is built on a substrate which carries a large number of magnetic transducer elements of the thin-film type. Magnetization is produced by a winding having a strip-shaped electric conductor in the fork of the yoke of each element and the connection conductors run along the sides of the pole pieces (the arms of the yoke). This configuration provides a relatively large overall width of the magnetic head, which is inconsistent with obtaining a high track density or, in the case of a specified recording medium width, a high number of tracks.

SUMMARY OF THE INVENTION

It is an object of the invention to provide a thin-film multitrack magnetic head by which a greater track density on the recording medium can be obtained than is possible with the heretofore known thin-film configuration. More particularly, it is an object to obtain such a magnetic head that is outstandingly suitable for recording digital sound, video or high-speed data signals.

Briefly, the conductor within the yoke is a conducting path put between a magnetic layer on the substrate or constituting the substrate and a magnetic layer thereabove. At its ends it connects to bridging strips leading to connection path strips lying on the other (top) side of the upper magnetic layer and leading away from the gap at the end of the yoke. Where these conducting paths go beyond the end of the magnetic layer they may be advantageously continued as superposed wider layers, with insulation between them in order to reduce electrical losses. In its broadest aspect the invention is distinguished in that the connecting paths are disposed essentially in the region of the yoke and connect around the side of the yoke with the conducting path that passes between the arms of the yoke.

It is particularly advantageous from the point of view of manufacture to provide the two connection strips on top of the upper magnetic layer and particularly to have them run parallel alongside each other separated by a gap. With this configuration there is obtained, in addition to space saving, a further reduction fo connection path resistance because of the relatively wide connection path width compared to what is possible with paths along the side of the yoke for a case of the same track width. In consequence there is a mitigation of the problems connected with the warming by ohmic losses that has been noted in multitrack heads. Instead of the arangement of conducting paths running alongside each other, it is also possible to provide the connecting paths one above the other on top of the upper magnetic layer. In that manner the electric resistance of the leads can be further reduced, but, on the other hand, a greater expense for manufacture is necessary. It is also possible to provide the connection path not on the upper magnetic layer but below the lower magnetic layer. This configuration can be advantageous in particular cases in order to lead away the heat dissipation from the connection leads, but yet it should normally be more practical to put the lower magnetic layer directly on the smooth substrate surface, because in this way the magnetic properties are better. Magnetic properties depend notably on the presence of edges and other such discontinuities in the covering of a magnetic layer which, if too many, lead to formation of magnetic domains and to stray flux, resulting in deterioration of the efficiency of the magnetic head. Roughnesses of an underlying structure, for example in intermediate under-layer, basically degrade the magnetic properties of a magnetic layer.

BRIEF DESCRIPTION OF THE DRAWINGS

The invention is further described by way of three illustrative examples with reference to the drawings, in which.

DESCRIPTION OF THE ILLUSTRATED EMBODIMENTS

Figures 1, 2:
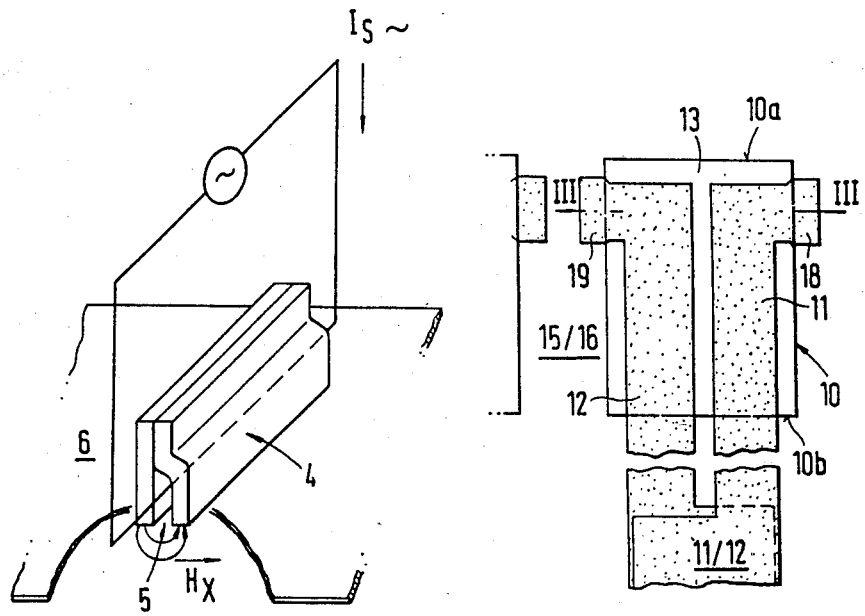
FIG. 1 is a basic diagram of inductive recording on a magnetic tape as it is conventionally understood.
FIG. 2 is a diagrammatic plan view of the basic constitution of a thin-film multitrack magnetic head according to the invention with two side-by-side connection paths on the upper magnetic layer.

In FIG. 1 there is shown a magnet yoke 4 of the kind produced by thin-film technology. A magnetic field Hx appears at the recording gap 5 of the yoke 4 and extends over to a magnetic tape 6. The magnitude of the magnetic field strength Hx is determined by the strength of a signal current is which passes through the magnetic yoke in a single turn winding as diagrammatically shown in FIG. 1.

Figure 3A:
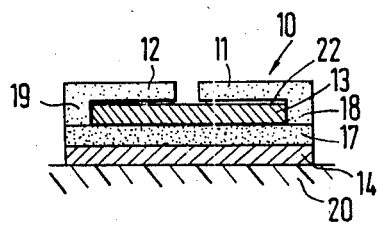
FIGS. 3A, 3B and 3C are respectively cross-sections along the line of III—III of FIG. 2 of three different embodiments of the invention.
Figure 3B:
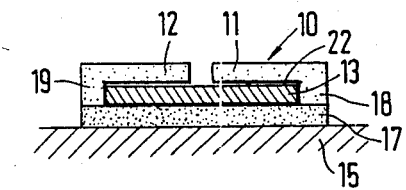
Figure 3C:
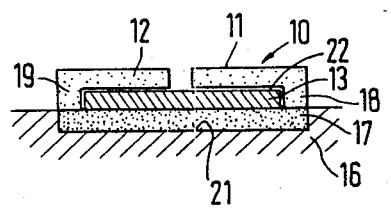

FIG. 2 shows an element 10 of a thin-film multitrack magnetic head which is suited preferably for recording. Two connection lead paths 11 and 12 are shown in the plan view of FIG. 2 on the second magnetic layer 13, which is the top and only magnetic layer shown in FIG. 2 but, as shown in FIGS. 3a, 3b and 3c, forms the magnetic head of a magnetic yoke 4 together with a lower magnetic layer 14, 15 or 16. In the region of the forward edge 10a of the element 10 the two magnetic layers just mentioned form the magnetically active gap 5 for recording on a magnetic recording medium 6. The magnetic layers 13 and 14 lie immediately one upon the other in the region 10b which is remote from the gap. The conducting connection paths 11 and 12 run spaced from each other in the region of the upper magnetic layer. Outside of the magnetic yoke they run electrically insulated from each other, one above the other and occupy the entire available width, so that the electrical resistance of the lead lines is further reduced. The lead lines 11, 12 therefore run essentially in the region of the magnetic yoke 4 and consequently require no additional space in the longitudinal direction of the gap 5, for which reason the track width can be substantially raised compared to the known recording arangement. Only in the region of the conductor 17, running inside the yoke between the two magnetic layers, is some lateral space required for contact straps 18 and 19 which connect the intra-yoke conducting path 17 with the connection lead paths 11 and 12.

FIG. 3 shows different sections along the line III—III in FIG. 2 for different embodiments. In FIG. 3a the magnetic head arrangement is mounted on an electrically insulating substrate 20. Next above the substrate is the lower magnetic layer 14, on which the inner conducting path 17 and the upper magnetic layer 13 are applied, on which in turn the electrically insulated connecting conductor paths 11 and 12 are applied. The width of the lower magnetic layer 14 corresponds at least to the width of the upper magnetic layer 13 plus the width required for the two lateral contacting straps 18 and 19; this holds also for the arrangement according to FIGS. 3b and 3c.

The structure shown in FIG. 3b utilizes a ferromagnetic material as the substrate which thus itself provides the lower magnetic layer 15. Above, it with electric insulation inserted in between, there are again the intra-yoke conducting path 17, with the contact straps 18 and 19 at the lateral edges, and the connection conductor paths 11 and 12 connected thereto, which are provided on the upper magnetic layer 13 electrically insulated therefrom.

FIG. 3c corresponds basically to the structure according to FIG. 3b with a ferritic material as substrate, with the magnetic substrate again providing the lower magnetic layer 16. The substrate has a cavity 21 for accomodating the conducting path 17 which runs through the yoke composed of the magnetic layers 13 and 16.

Between the connection conducting paths 11 and 12 and the upper magnetic layer 13 there is provided insulation which may be, for example, a polyimide varnish layer 22. The insulation between the upper magnetic layer and the internal conducting path 17 and likewise the latter and lower magnetic layer 14, 15 or 16, preferably consists of a ceramic material (SiO$_2$, Al$_2$O$_3$), which is applied by a vapor deposition process or by cathodic sputtering. The inner conducting path 17 between the two magnetic layers of the yoke 4 is also provided by a vapor deposition process. In contract thereto the connection conducting paths 11 and 12 on the upper magnetic layer 13 and outside of the latter are produced by galvanic deposition, preferably in a thickness of about 5 $\mu$m, with the structure of the connection leads 11 and 12 being prescribed by a photolithographic mask.

In the illustrated preferred embodiments, therefore, the connecting led paths 11 and 12 of the thin-film magnetic head for each individual element 10 are brought out upwards directly alongside the upper magnetic layer 13. The connection lead paths 11 and 12 lead back from the yoke area on the upper magnetic layer 13, the conducting paths 11 and 12 lying one above the other where they extend beyond the magnetic head proper, in order to obtain greater path width and are separated there by an electrically insulating layer. The lower magnetic layer 14, 15 or 16 of the thin-film magnetic head is at least wide enough for the conducting path piece 17 that runs between the upper and lower magnetic layers not to have to pass beyond a structure edge. The lower magnetic layer can be either a magnetic layer applied on an insulating material substrate or else a part of a magnetic substrate. The provision of the connection conducting paths is in each case made in the same way.

A significant increase of the track width of multitrack magnetic heads made by thin-film technology is made possible by the structure of the present invention because the conducting paths brought back alongside next to the magnetic layer are eliminated, resulting in a substantial lateral space saving. Because of the high currents present in a magnetic head with only a single turn winding there are limits on the reduction in width of the conducting paths, but by the structure of the invention adequate conducting path widths can be provided without any supplementary space requirement. The power loss resulting from the ohmic resistance of the connection lead paths 11 and 12 therefore do not produce any thermal mode of the magnetic head worth mentioning. The lateral space requirement for element 10 amounts to only about 5 to 10 $\mu$m for the contacting strips 18 and 19 on both sides of the magnetic layer for the purpose of connecting the inner conducting path 17 with the connection lead paths 11 and 12. In this manner it is possible, with a track width of 90 $\mu$m, for example, to reduce the space requirement per head to about 100 to 110 $\mu$m, whereas in conventional structures with laterally disposed connection conduction conductors, for the same track width and the same connection path width, there was a space requirement of about 150 $\mu$m. This corresponds to a reduction of the overall width of about $\frac{1}{3}$, so that under otherwise identical conditions the track width can be increased in corresponding measure.

Although the invention has been described with reference to particular illustrated embodiments, it will be recognized that variations and modifications are possible within the inventive concept.

We claim:

1. Thin-film magnetic head suitable for multitrack magnetic recording of digial signals and comprising:
    superposed first (14) and second (13) magnetic layers together forming a magnetic yoke, being superposed in contact with each other in a first region and having a gap between them in a second region adjacent to said first region;
    an interposed conductor path (17) passing between said first and second magnetic layers in said gap in said second region, in a direction substantially parallel to the boundary between said first and second regions;
    connecting lead paths (11,12) disposed as side-by-side layers spaced apart from each other on the face of said second magnetic layer (13) opposite the face thereof which faces said first magnetic layer and extending over both said first and second regions of said yoke, leading away from said second region of said yoke towards and across said first region thereof, and
    connecting conducting path elements (18, 19) at opposite sides of said second region of said yoke connecting the respective ends of said interposed conductor path (17) to said respective connecting lead paths (11,12) and running across opposite lateral edges of said second magnetic layer.

2. Magnetic head according to claim 1 in which said first magnetic layer lies on or is a substrate for said magnetic head and said second magnetic layer is the more remote one of said layers from said substrate.

3. Magnetic head according to claim 2 in which said connection lead paths (11, 12) extend beyond the region of said magnetic yoke and are disposed, for at least part of their course outside of the region of said yoke, one above the other and separated from each other by a layer of electrical insulation.

4. Magnetic head according to claim 2 in which the insulation between said second magnetic layer (13) and said connecting lead paths (11, 12) consists of a polyimide varnish layer.

5. Magnetic head according to claim 2 in which said interposed conductor path (17) is provided by a vapor deposited layer of a thickness less than 1 μm lying on said first magnetic layer (14, 15, 16).

6. Magnetic head according to claim 5 in which said connecting lead paths (11, 12) are provided, both on said second magnetic layer (13) and beyond it, and said connecting path elements (18, 19) likewise are provided, by galvanic deposition to a thickness between 2 μm and 10 μm.

7. Magnetic head according to claim 2 in which said first magnetic layer (14) has at least a width equal to the sum of the width of said second magnetic layer (13) plus the width in the same dimension of said connecting conductor path elements (18, 19).

8. Magnetic head according to claim 1 in which said first magnetic layer (14, 15, 16) is provided on a plane substrate (20) consisting of electrically insulating material.

9. Magnetic head according to claim 1 in which said first magnetic layer (14, 15, 16) consists of a ferromagnetic material constituted as a substrate (16, 17) for the magnetic head.

10. Magnetic head according to claim 9 in which said ferromagnetic material of said substrate (16, 17) is a ferritic material.

11. Magnetic head according to claim 9 in which a cavity (21) is provided in said magnetic substrate which is occupied by at least the portion of said interposed conductor path (17) passing between said first and second magnetic layers of said yoke.

* * * * *